US012710082B2

(12) United States Patent
Winkler et al.

(10) Patent No.: US 12,710,082 B2
(45) Date of Patent: Aug. 18, 2026

(54) DAMPED STRUCTURE WITH INTERNAL LATTICE AND VIBRATION DAMPER(S)

(71) Applicant: Raytheon Company, Waltham, MA (US)

(72) Inventors: Julian Winkler, Glastonbury, CT (US); Kenji Homma, Glastonbury, CT (US); Craig A. Reimann, Vernon, CT (US); Jeffrey M. Mendoza, Manchester, CT (US)

(73) Assignee: Raytheon Company, Tewksbury, MA (US)

( * ) Notice: Subject to any disclaimer, the term of this patent is extended or adjusted under 35 U.S.C. 154(b) by 791 days.

(21) Appl. No.: 17/971,258

(22) Filed: Oct. 21, 2022

(65) Prior Publication Data

US 2024/0133444 A1 Apr. 25, 2024
US 2024/0229887 A9 Jul. 11, 2024

(51) Int. Cl.
*F16F 7/104* (2006.01)
*F16F 7/00* (2006.01)

(52) U.S. Cl.
CPC ...... *F16F 7/104* (2013.01); *F16F 2224/0225* (2013.01); *F16F 2234/06* (2013.01)

(58) Field of Classification Search
CPC .................................................. F16F 2234/06
See application file for complete search history.

(56) References Cited

U.S. PATENT DOCUMENTS

| | | | | |
|---|---|---|---|---|
| 7,076,956 | B2 | 7/2006 | Young | |
| 7,311,175 | B2 | 12/2007 | Proscia | |
| 8,544,597 | B1 | 10/2013 | Mcenerney | |
| 10,371,381 | B2 | 8/2019 | Xu | |
| 10,724,739 | B2 | 7/2020 | Kim | |
| 10,823,409 | B2 | 11/2020 | Bertoldi | |
| 10,982,672 | B2 | 4/2021 | Scancarello | |
| 2017/0188650 | A1* | 7/2017 | Hector, Jr. | B32B 15/08 |
| 2018/0312086 | A1* | 11/2018 | Meingast | B60N 2/7017 |
| 2019/0122649 | A1 | 4/2019 | Sheng | |
| 2020/0023584 | A1 | 1/2020 | Portela | |
| 2020/0180523 | A1 | 6/2020 | Chang | |
| 2020/0309227 | A1* | 10/2020 | Mishra | F16F 7/128 |

FOREIGN PATENT DOCUMENTS

| | | | |
|---|---|---|---|
| CN | 105845121 | B | 12/2019 |
| CN | 114044083 | A | 2/2022 |
| CN | 114294363 | B | 11/2022 |
| EP | 4040007 | A1 | 8/2022 |
| JP | 2019045789 | A | 3/2019 |
| WO | 2020208323 | A1 | 10/2020 |

OTHER PUBLICATIONS

International Search Report for PCT/US2023/035516 dated Feb. 16, 2024.

* cited by examiner

*Primary Examiner* — Melody M Burch
(74) *Attorney, Agent, or Firm* — Getz Balich LLC

(57) ABSTRACT

An apparatus is provided that includes a structure. This structure includes a first skin, a second skin and a cellular core connected to the first skin and the second skin. The cellular core includes a cantilevered damper and an internal cavity between the first skin and the second skin. The cantilevered damper projects into the internal cavity. The cantilevered damper includes a plurality of damper masses and a plurality of damper arms interconnecting the plurality of damper masses together.

20 Claims, 20 Drawing Sheets

DAMPED STRUCTURE WITH INTERNAL LATTICE AND VIBRATION DAMPER(S)

BACKGROUND OF THE DISCLOSURE

1. Technical Field

This disclosure relates generally to a structure with internal vibration damping structures.

2. Background Information

Various apparatuses such as vehicles, powerplants, electronics and the like may generate and/or may be subject to vibrations during operation. These vibrations may be uncomfortable for nearby observers and/or may subject one or more components of the apparatus to internal stresses and/or disrupt component and/or apparatus operation. Various techniques and devices are known in the art for damping vibrations. While these known vibration damping techniques and devices have various benefits, there is still room in the art for improvement.

SUMMARY OF THE DISCLOSURE

According to an aspect of the present disclosure, an apparatus is provided that includes a structure. This structure includes a first skin, a second skin and a cellular core connected to the first skin and the second skin. The cellular core includes a cantilevered damper and an internal cavity between the first skin and the second skin. The cantilevered damper projects into the internal cavity. The cantilevered damper includes a plurality of damper masses and a plurality of damper arms interconnecting the plurality of damper masses together.

According to another aspect of the present disclosure, another apparatus is provided that includes a structure. This structure includes a first skin, a second skin and a lattice structure between the first skin and the second skin. The lattice structure includes a base and a damper. The base at least partially forms an internal cavity between the first skin and the second skin. The base is formed from a plurality of base masses and a plurality of base arms interconnecting the base masses together. The damper is cantilevered from the base and projecting partially into the internal cavity. The damper includes a plurality of damper masses and a plurality of damper arms interconnecting the damper masses together and to the base.

According to still another aspect of the present disclosure, another apparatus is provided that includes a structure. This structure includes a first skin, a second skin and a core. The core includes a cantilevered damper and an internal cavity between the first skin and the second skin. The cantilevered damper projects into the internal cavity. The cantilevered damper includes a damper mass and a damper arm connected to the damper mass. The damper mass is disposed at an unsupported distal end of the cantilevered damper. One or more perforations through the first skin are fluidly coupled with a resonance chamber within the core.

The resonance chamber may be configured as or otherwise include the internal cavity.

The resonance chamber may be configured as or otherwise include a volume internal to a member of the core.

The damper masses may include a first damper mass and a second damper mass. The damper arms may include a first damper arm and a second damper arm. The first damper mass may connect the first damper arm to the second damper arm. The second damper arm may connect the first damper mass to the second damper mass.

The first damper arm, the first damper mass, the second damper arm and the second damper mass may be arranged sequentially along a first axis.

The cantilevered damper may project into the internal cavity along the first axis to an unsupported distal end of the cantilevered damper.

The damper masses may also include a third damper mass. The damper arms may also include a third damper arm. The third damper arm may be between the second damper mass and the third damper mass along the first axis.

The cellular core may be between the first skin and the second skin along a second axis that is angularly offset from the first axis. The damper masses may also include a third damper mass. The damper arms may also include a third damper arm. The third damper arm may be between the second damper mass and the third damper mass along the second axis.

The cellular core may be between the first skin and the second skin along a second axis that is angularly offset from the first axis. The damper masses may also include a third damper mass. The damper arms may also include a third damper arm. The third damper arm may be between the second damper mass and the third damper mass along a third axis that is angularly offset from the first axis and the second axis.

The first damper mass may be between the first damper arm and the second damper arm along a first axis. The second damper arm may be between the first damper mass and the second damper mass along a second axis that is angularly offset from the first axis.

The cellular core may be between the first skin and the second skin along the second axis.

The cellular core may be between the first skin and the second skin along a third axis is angularly offset from the first axis and the second axis.

A first of the damper masses may be solid.

A first of the damper masses may have an internal volume that is fluidly coupled with a perforation in the first skin.

A first of the damper arms may have an internal bore that is between and fluidly couples the internal volume to the perforation in the first skin.

The internal cavity may be fluidly coupled with one or more perforations in the first skin.

The cellular core may also include a lattice structure that at least partially forms the internal cavity between the first skin and the second skin. The cantilevered damper may be connected to and project out from a base of the lattice structure into the internal cavity.

The lattice may include a plurality of base masses and a plurality of base arms interconnecting the base masses together.

A first of the base masses may be solid.

A first of the base masses may have an internal volume that is fluidly coupled with a perforation through the first skin.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
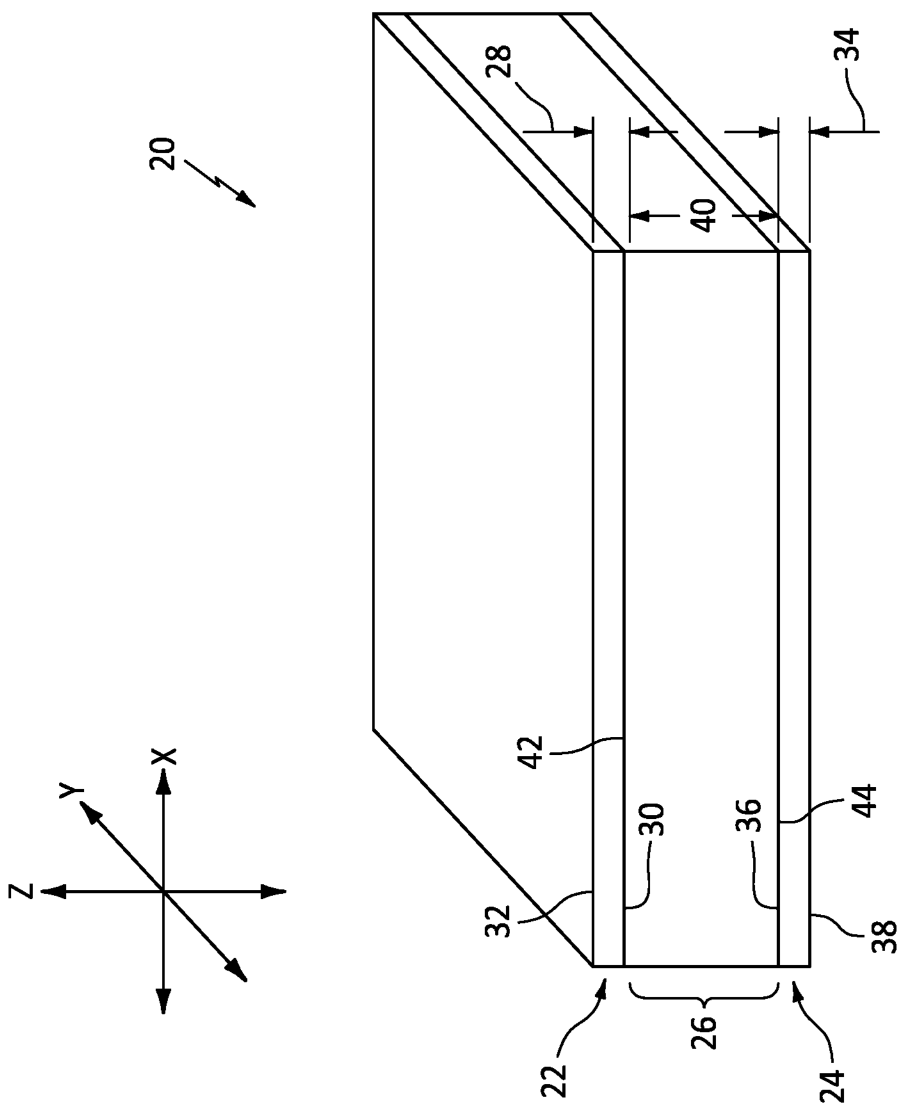
FIG. 1 is a partial perspective schematic illustration of a damped structure.

FIG. 1 is a partial perspective schematic illustration of a damped structure 20. This damped structure 20 may be configured as, or may otherwise be included in, a wall, a support and/or any other structure subject to vibrations. Examples of the wall include, but are not limited to, a duct wall, a pipe wall, a case wall, a liner wall, a shell wall, a tank wall, a compartment wall, a vessel wall, a bulkhead wall and a housing wall. This wall may be an interior wall, an exterior wall, a sidewall and/or an endwall. Examples of the support include, but are not limited to, a strut, a vane, a post, a mount, a pylon, a rack and a cabinet. The damped structure 20 may form, or may otherwise be included in, a component of an arial vehicle, an aquatic vehicle (e.g., a boat, a ship, a submersible, etc.), a terrestrial vehicle, a powerplant, an electric device, industrial equipment, electronic equipment and/or any other apparatus which vibrates during operation and/or which may be subject to vibrations during operation.

The damped structure 20 extends laterally in a first lateral direction (e.g., an x-axis direction) along a first lateral axis; e.g., an x-axis. The damped structure 20 extends laterally in a second lateral direction (e.g., a y-axis direction) along a second lateral axis (e.g., a y-axis), which second lateral axis is angularly offset from the first lateral axis by an angle; e.g., a right angle. The damped structure 20 extends vertically in a vertical direction (e.g., a z-axis direction) along a vertical axis (e.g., a z-axis), which vertical axis is angularly offset from the first lateral axis by an angle (e.g., a right angle), and/or which vertical axis angularly offset from the second lateral axis by an angle (e.g., a right angle). Note, the term “lateral” may be used herein to generally describe the first lateral (x) direction, the second lateral (y) direction and/or any other direction within a lateral plane; e.g., the x-y plane. Also note, the term “vertical” may be used herein to describe a depthwise structure direction and is not limited to a gravitational up/down direction. Furthermore, for ease of illustration, the lateral (e.g., x-y) plane is shown in FIG. 1 as a generally flat plane. However, in other embodiments, the lateral (x-y) plane and, thus, the damped structure 20 may be curved and/or follow an undulating geometry. For example, the lateral (x-y) plane and, thus, the damped structure 20 may be arcuate, cylindrical, conical, frustoconical, or tapered with or without radial undulations. In such embodiments, a solely vertical (z-axis) direction is defined relative to a position of interest on the lateral (x-y) plane. For example, on a spherical lateral (x-y) plane, the vertical (z-axis) direction is a radial direction.

The damped structure 20 of FIG. 1 includes a solid (e.g., non-perforated) first skin 22, a solid (e.g., non-perforated) second skin 24 and a cellular core 26. The cellular core 26 is arranged vertically between and may extend vertically to the first skin 22 and/or the second skin 24. The cellular core 26 may be connected to the first skin 22 and/or the second skin 24. The cellular core 26, for example, may be welded, brazed, fused, adhered or otherwise bonded to the first skin 22 and/or the second skin 24. In another example, the cellular core 26 may be formed integral with the first skin 22 and/or the second skin 24 as a monolithic body.

The first skin 22 may be a relatively thin sheet or layer of (e.g., continuous, uninterrupted, non-porous, etc.) material that extends laterally within the lateral (x-y) plane. This first skin material may be or otherwise include metal and/or non-metal material. An example of the non-metal material is a polymer; e.g., thermoplastic or thermoset. Another example of the non-metal material is a composite of fiber-reinforcement within a polymer matrix. Still other examples of the non-metal material is a ceramic or various other common structural materials. The present disclosure, however, is not limited to the foregoing exemplary first skin materials. The first skin 22 has a vertical thickness 28. This first skin vertical thickness 28 extends vertically between opposing side surfaces 30 and 32 of the first skin 22.

The second skin 24 may be a relatively thin sheet or layer of (e.g., continuous, uninterrupted, non-porous, etc.) material that extends laterally within the lateral (x-y) plane. This second skin material may be or otherwise include metal and/or non-metal material. An example of the non-metal material is a polymer; e.g., thermoplastic or thermoset. Another example of the non-metal material is a composite of fiber-reinforcement within a polymer matrix. Still other examples of the non-metal material is a ceramic or various other common structural materials. The present disclosure, however, is not limited to the foregoing exemplary second skin materials. The second skin material may be the same as or different than the first skin material. The second skin 24 has a vertical thickness 34. This second skin vertical thickness 34 extends vertically between opposing side surfaces 36 and 38 of the second skin 24. The second skin vertical thickness 34 may be equal to or different (e.g., greater or less) than the first skin vertical thickness 28.

The cellular core 26 extends laterally within the lateral (x-y) plane. The cellular core 26 has a vertical thickness 40. This core vertical thickness 40 extends vertically between opposing sides 42 and 44 of the cellular core 26. The core side 42 may be abutted against the interior side surface 30 of the first skin 22. The core side 44 may be abutted against the interior side surface 36 of the second skin 24. The core vertical thickness 40 may be substantially greater than the first skin vertical thickness 28 and/or the second skin vertical thickness 34. The core vertical thickness 40, for example, may be between ten times (10×) to forty times (40×) greater than the first skin vertical thickness 28 and/or the second skin vertical thickness 34. The damped structure 20 of the present disclosure, however, is not limited to such exemplary dimensional relationships. The core thickness, for example, may alternatively be less than ten times (10×) greater than, or more than forty times (40×) greater than the first skin vertical thickness 28, the second skin vertical thickness 34.

Figure 2:
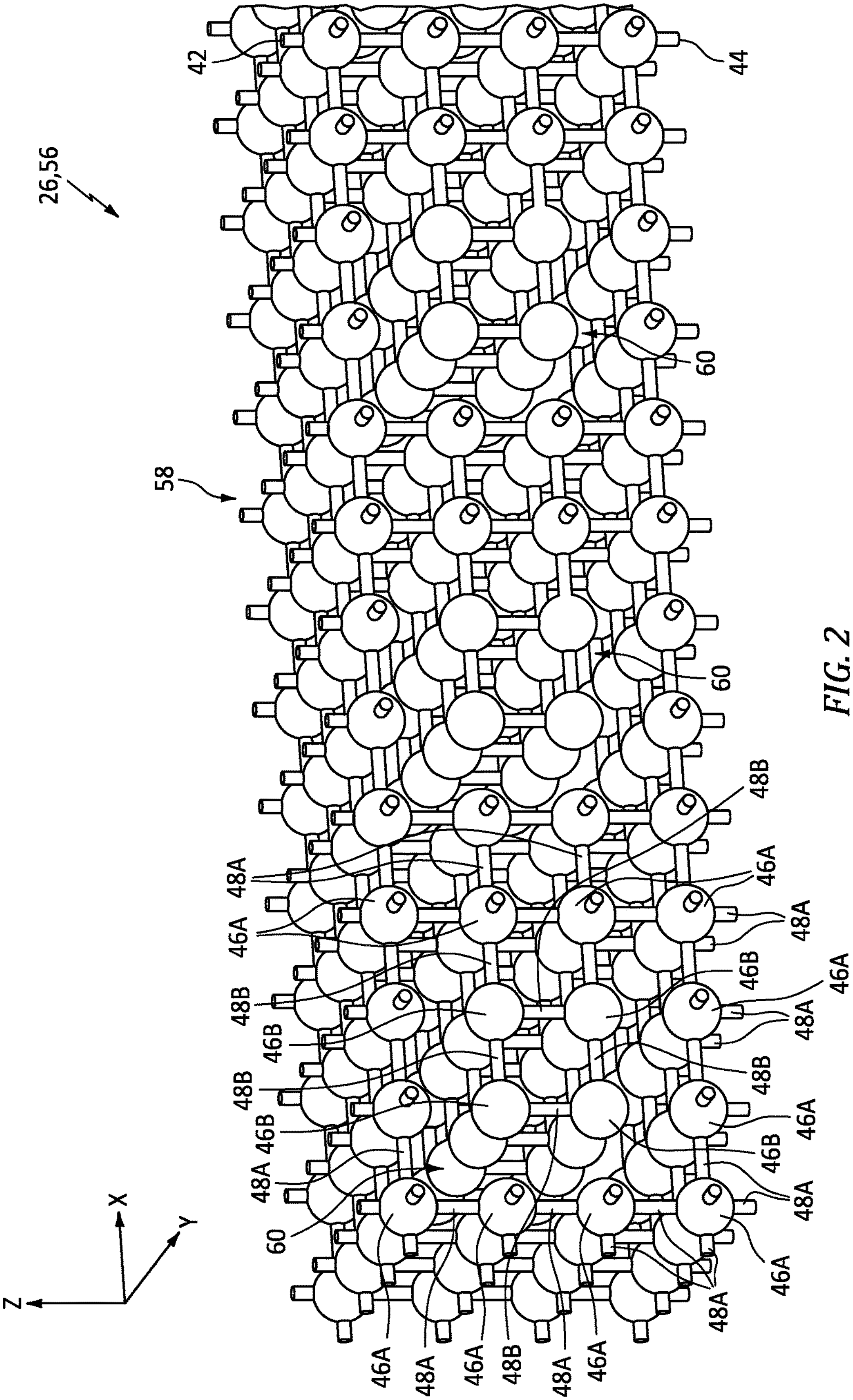
FIG. 2 is a perspective illustration of a portion of a cellular core for the damped structure.

Referring to FIG. 2, the cellular core 26 includes a plurality of core masses 46A and 46B (generally referred to as "46") and a plurality of core arms 48A and 48B (generally referred to as "48"); note, only select core masses and select core arms are labeled within the drawings for ease of illustration. The core masses 46 may include one or more base masses 46A and one or more damper masses 46B. The core arms 48 may include one or more base arms 48A and one or more damper arms 48B. These core members 46 and 48 are formed from one or more core materials such as, but not limited to, metal and/or non-metal material. An example of the non-metal material is a polymer; e.g., thermoplastic or thermoset. Another example of the non-metal material is a composite of fiber-reinforcement within a polymer matrix. Still other examples of the non-metal material is a ceramic or various other common structural materials. The present disclosure, however, is not limited to the foregoing exemplary core materials.

Figure 3B:
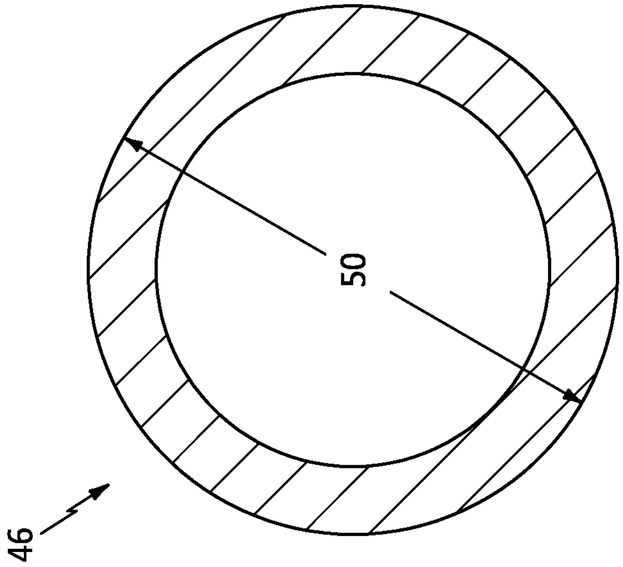
FIGS. 3A and 3B are schematic sectional illustrations of various core masses.
Figure 3A:
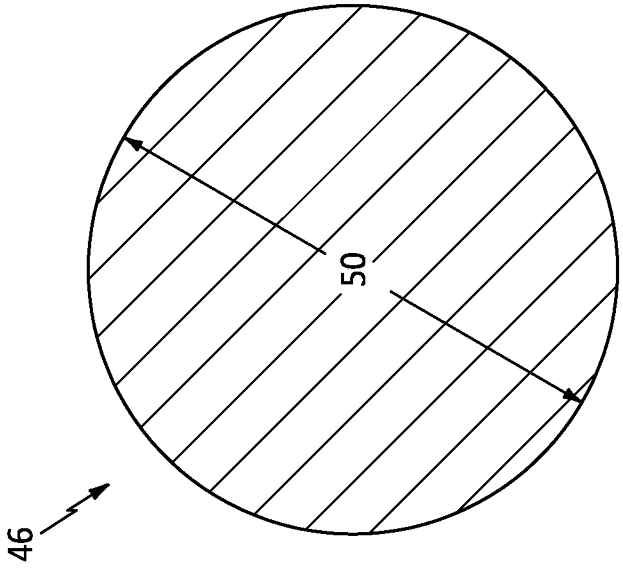
Figure 4A:
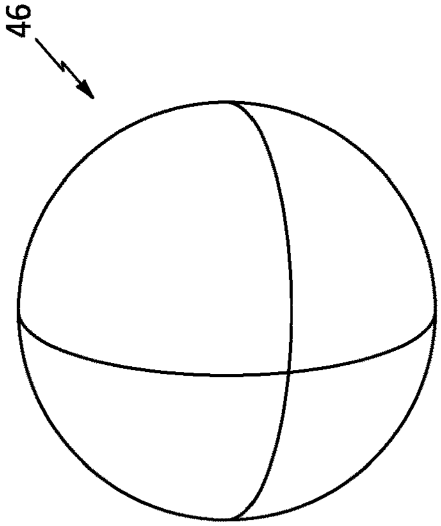
FIGS. 4A-E are perspective illustrations of a core mass with various geometries.
Figure 4B:
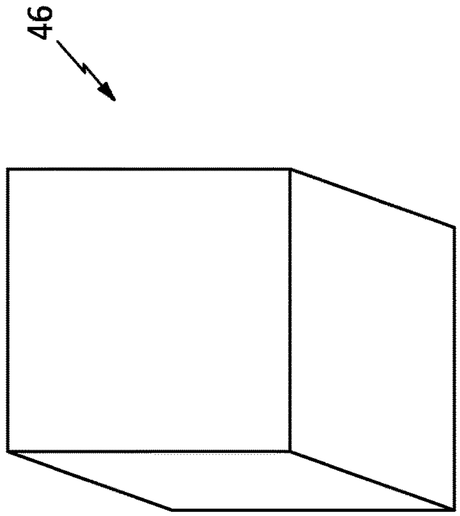
Figure 4C:
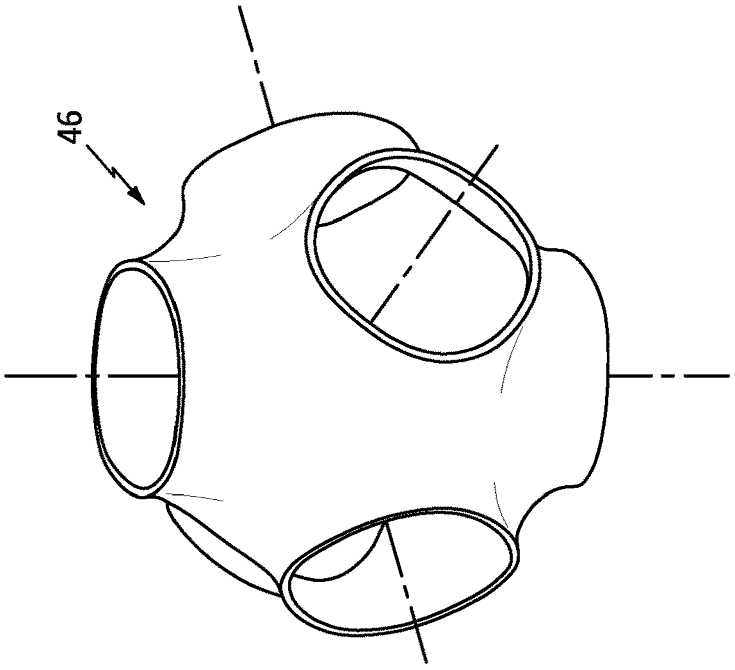
Figure 4E:
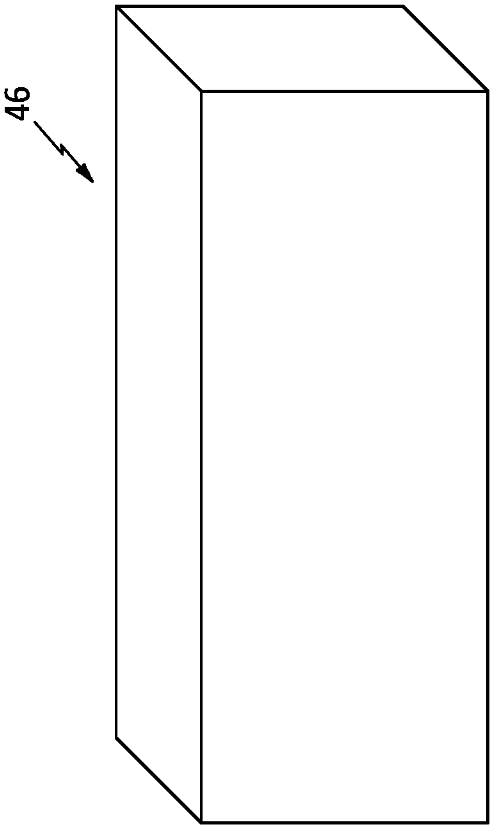
Figure 4D:
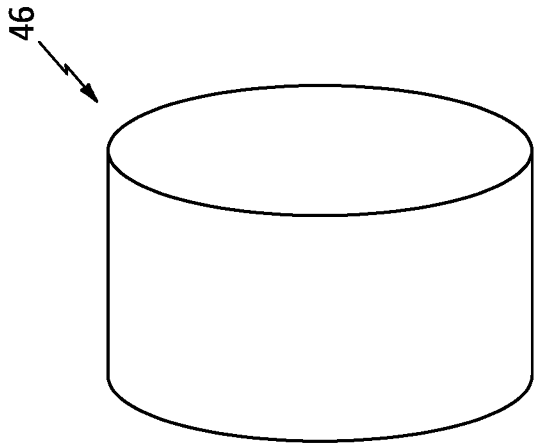

Referring to FIGS. 3A and 3B, each of the core masses 46 may be configured as a mass of material; e.g., a point mass, a concentrated mass, etc. This mass of material may be solid (e.g., see FIG. 3A) or hollow (e.g., see FIG. 3B). Each of the core masses 46 has a core mass geometry. This core mass geometry may be symmetrical. The core mass geometry, for example, may be spherical (e.g., see FIG. 4A), cubicle (e.g., see FIG. 4B) or a Schwarz-P body (e.g., see FIG. 4C). The present disclosure, however, is not limited to such exemplary core mass geometries, nor to symmetrical core mass geometries. The core mass geometry, for example, may alternatively be cylindrical (e.g., see FIG. 4D) or a rectangular cuboid (e.g., see FIG. 4E). Each of the core masses 46 of FIGS. 3A and 3B has a core mass size 50; e.g., a diameter, a width, etc. Referring to FIG. 2, the core masses 46 may be configured with common (the same) configurations; e.g., common geometries, common sizes, formed from common material(s), etc. Alternatively, one or more of the core masses 46 may have a different configuration than one or more of the other core masses 46. For example, the base masses 46A may have different geometries, different sizes and/or may be formed from different materials than the damper masses 46B. In addition or alternatively, one or more of the base masses 46A may have different configurations than one or more of the other base masses 46A, and/or one or more of the damper masses 46B may have different configurations than one or more of the other damper masses 46B.

Figure 5A:
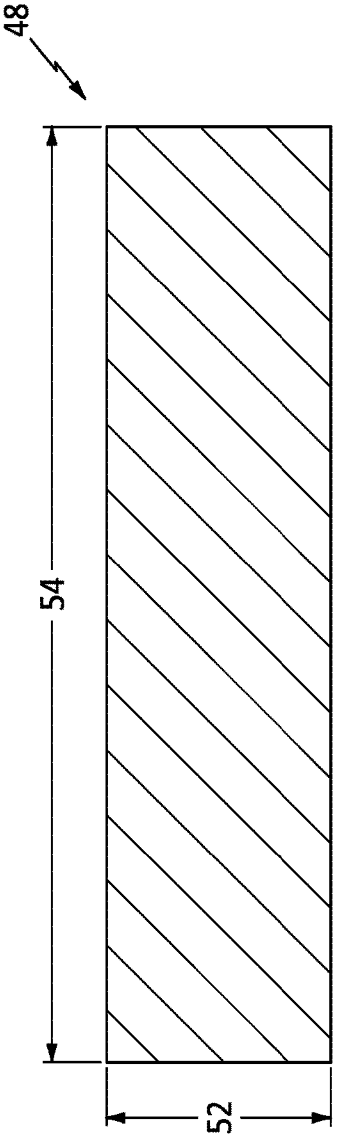
FIGS. 5A and 5B are schematic sectional illustrations of various core arms.
Figure 5B:
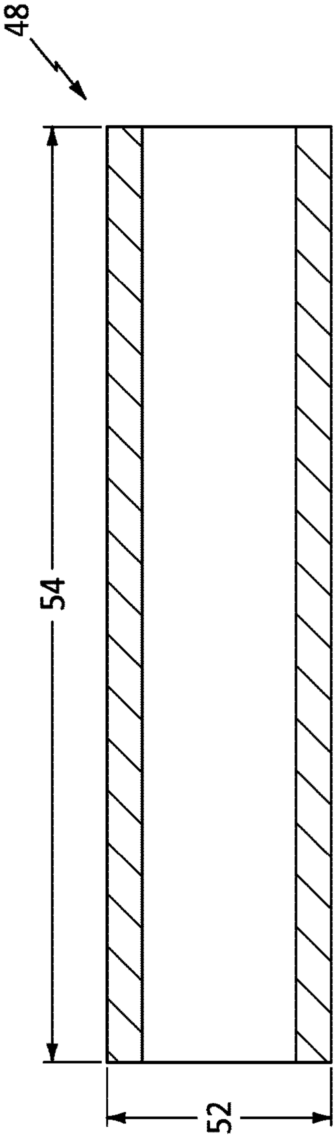
Figure 5C:
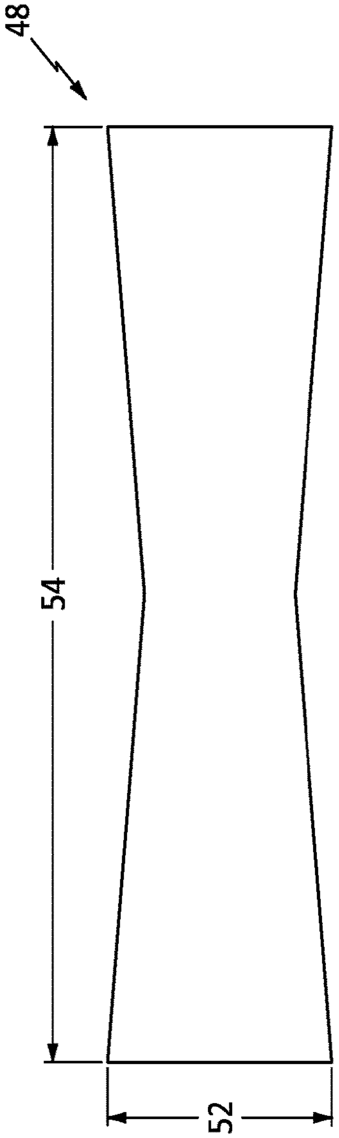
FIG. 5C is a schematic side illustration of another core arm.
Figure 6B:
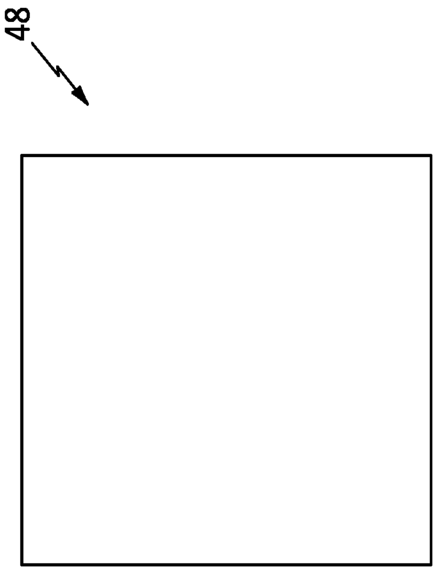
FIGS. 6A and 6B are schematic illustrations of a core arm with various geometries.
Figure 6A:
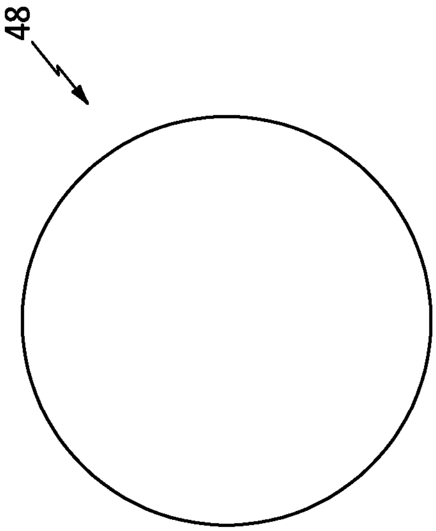

Referring to FIGS. 5A-C, each of the core arms 48 may be configured as a linkage; e.g., a rod or a tube. This linkage may be solid (e.g., see FIG. 5A) or hollow (e.g., see FIG. 5B). Each of the core arms 48 has a core arm geometry. This core arm geometry, for example, may be cylindrical or prismatic. The core arm 48 of FIG. 6A, for example, has a rounded (e.g., circular, oval, etc.) cross-sectional geometry. In another example, the core arm 48 of FIG. 6B has a polygonal (e.g., square, rectangular, triangular, etc.) cross-sectional geometry. The present disclosure, however, is not limited to such exemplary core arm geometries. Each of the core arms 48 of FIGS. 5A-C has a core arm size 52 (e.g., a diameter, a width, etc.) and a core arm length 54. The core arm size 52 may be less than the core mass size 50 (e.g., see FIGS. 3A and 3B). The core mass size 50, for example, may be at least one and one-half times (1.5×), two times (2×), three times (3×), five times (5×), or more than core arm size 52; however, the present disclosure is not limited to such a dimensional relationship. Referring to FIGS. 5A and 5B, this core arm size 52 may remain uniform along the longitudinal length 54 of the respective core arm 48; e.g., between a respective adjacent pair of the core masses 46 (see FIG. 2). Alternatively, referring to FIG. 5C, the core arm size 52 may continuously or intermittently vary (e.g., increase and/or decrease) along the longitudinal length 54 of the respective core arm 48. Referring to FIG. 2, the core arms 48 may be configured with common configurations; e.g., common geometries, common sizes, common lengths, formed from common material(s), etc.

Alternatively, one or more of the core arms 48 may have a different configuration than one or more of the other core arms 48. For example, the base arms 48A may have different geometries, different sizes, different lengths and/or may be formed from different materials than the damper arms 48B. In addition, or alternatively, one or more of the base arms 48A may have different configurations than one or more of the other base arms 48A, and/or one or more of the damper arms 48B may have different configurations than one or more of the other damper arms 48B.

Figure 7:
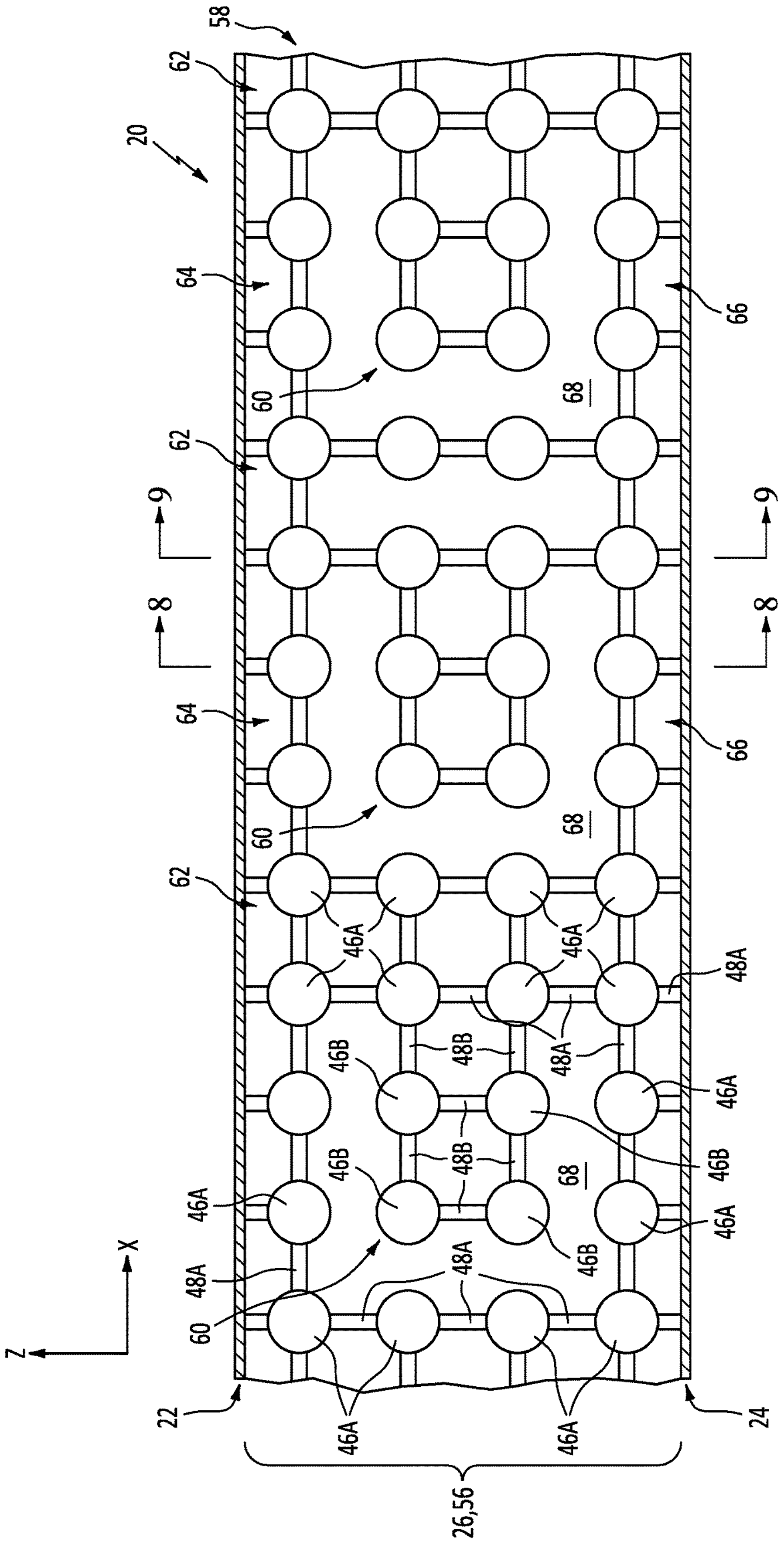
FIG. 7 is a sectional illustration of a portion of the damped structure.
Figure 8:
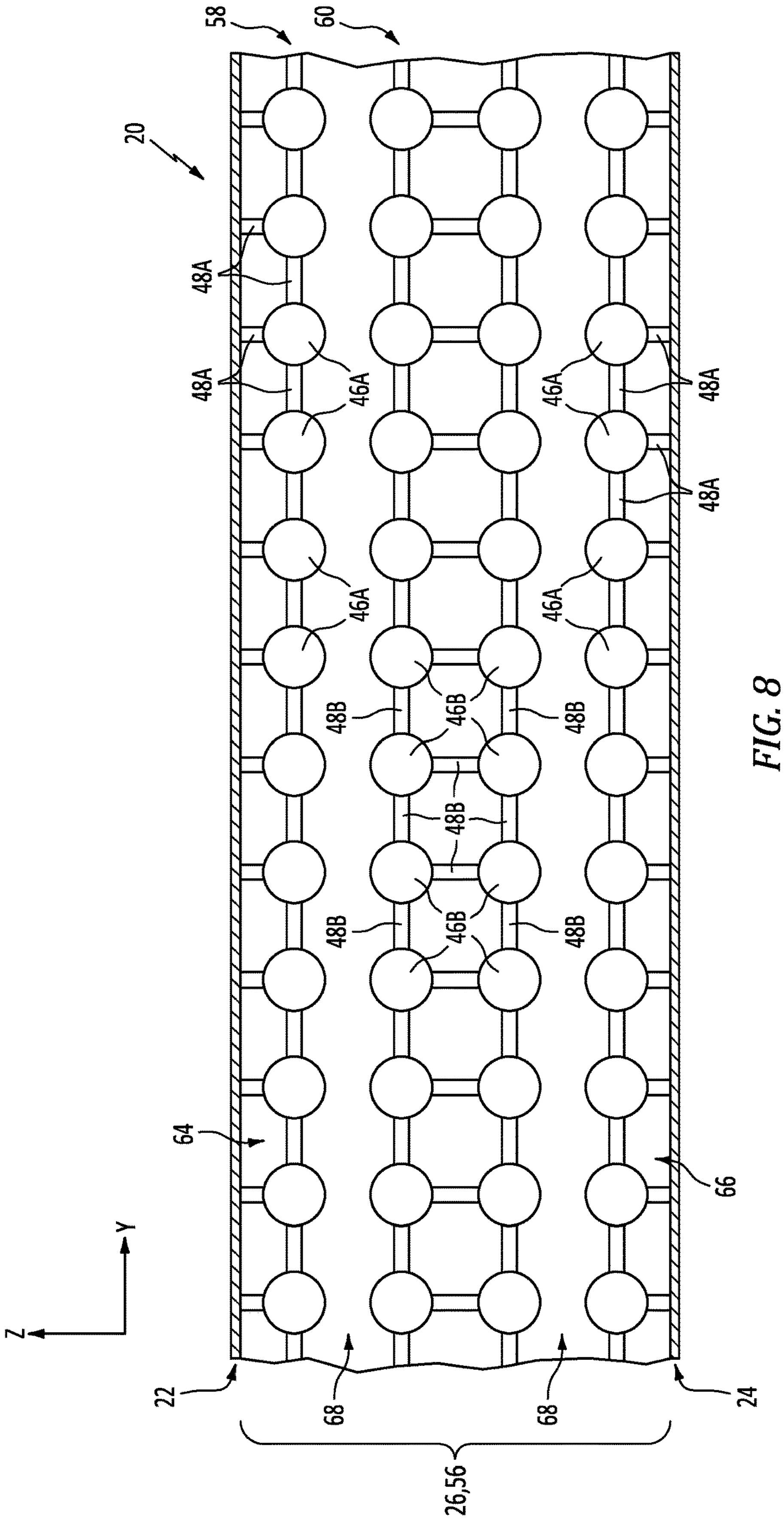
FIG. 8 is a sectional illustration of another portion of the damped structure taken along line 8-8 in FIG. 7.

The core masses 46 may be arranged in a (e.g., uniform, equispaced) three-dimensional array or matrix. The core masses 46 of FIG. 2, for example, are arranged into a plurality of (e.g., equispaced) rows along the first lateral axis; e.g., the x-axis. The core masses 46 are arranged into a plurality of (e.g., equispaced) rows along the second lateral axis; e.g., the y-axis. The core masses 46 are also arranged into a plurality of (e.g., equispaced) rows along the vertical axis; e.g., the z-axis. These core masses 46 of FIG. 2 are further interconnected with one another by the core arms 48, which may thereby provide the cellular core 26 with a core lattice structure 56. Each core arm 48 of FIGS. 7-9, for example, extends between and connects a respective neighboring (e.g., adjacent) pair of the core masses 46. More particularly, each neighboring pair of the base masses 46A are linked by a (e.g., single) respective one of the base arms 48A. Each neighboring pair of the arm masses 46B are linked by a (e.g., single) respective one of the damper arms 48B. Furthermore, one or more select neighboring pairs of the core masses 46A and 46B are linked by a (e.g., single) respective one of the damper arms 48B (see FIG. 7). However, at least some of the neighboring pairs of the core masses 46A and 46B are disengaged from one another—not linked by an arm 48A or 48B. With this arrangement, the cellular core 26 and its core lattice structure 56 of FIGS. 7 and 8 are configured with a core base 58 and one or more core dampers 60; e.g., cantilevered vibration dampers.

The core base 58 may provide a structural backbone and/or frame for the damped structure 20. The core base 58 of FIGS. 7-9, for example, includes one or more core stiffeners 62 (see FIGS. 7 and 9), one or more first core walls 64 (see FIGS. 7 and 8) and one or more second core walls 66 (see FIGS. 7 and 8). Referring to FIG. 7, each core stiffener 62 extends vertically between and is connected to the first skin 22 and the second skin 24. Each first core wall 64 extends laterally along the first skin 22, for example between a respective neighboring pair of the core stiffeners 62. Each second core wall 66 extends laterally along the second skin 24, for example between a respective neighboring pair of the core stiffeners 62. Each second core wall 66 may further laterally overlap a respective one of the first core walls 64. However, the overlapping core walls 64 and 66 of FIG. 7 (see also FIG. 8) are vertically separated apart from one another. The cellular core 26 may thereby be formed with one or more internal cavities 68; e.g., pockets, uninterrupted (when not considering the respective core damper 60) internal volumes, etc. Each internal cavity 68 is vertically between the first skin 22 and the second skin 24. More particularly, each internal cavity 68 of FIG. 7 is vertically between and formed by a respective pair of the overlapping core walls 64 and 66; see also FIG. 8. Each internal cavity 68 is laterally (in the first lateral (x) direction) between and formed by a respective neighboring pair of the core stiffeners 62. However, in other embodiments, one or more of the internal cavities 68 may alternatively be partially formed by at least one of the skins 22 and/or 24; e.g., at least one of the core walls 64 and/or 66 may be omitted.

Figure 9:
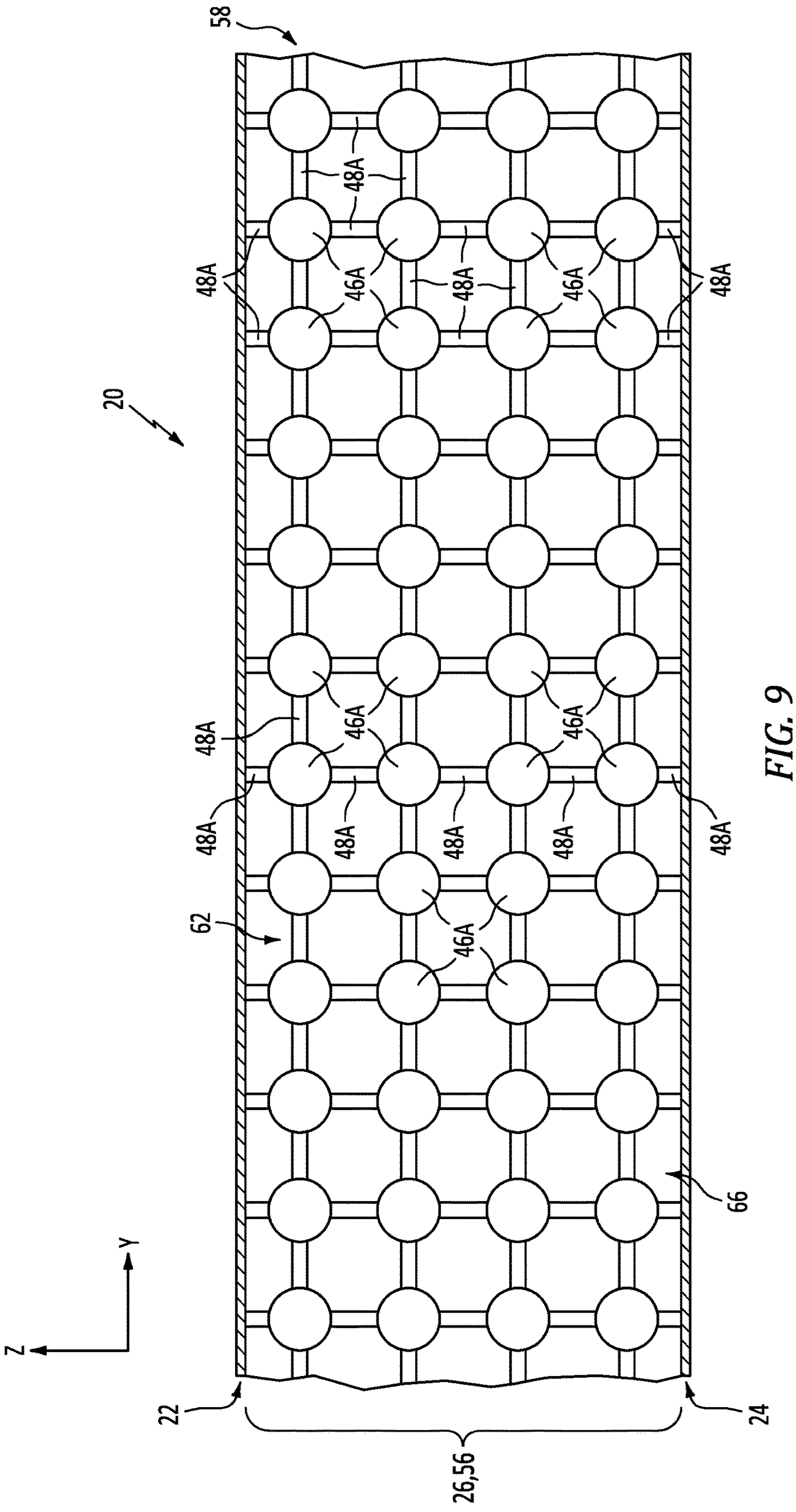
FIG. 9 is a sectional illustration of another portion of the damped structure taken along line 9-9 in FIG. 7.
Figure 10:
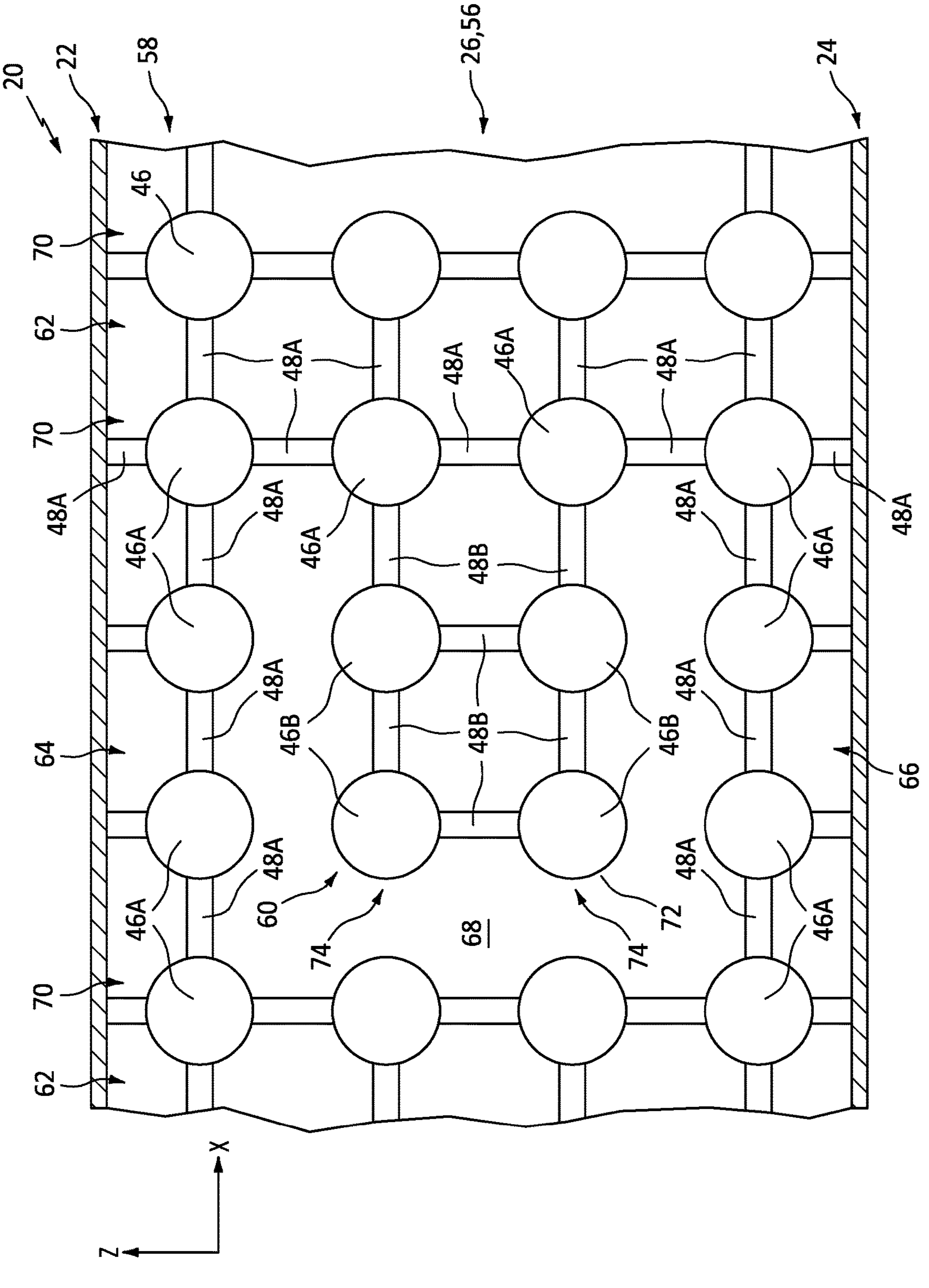
FIG. 10 is a sectional illustration of a portion of the damped structure at a cantilevered core damper.

Referring to FIG. 10, each core stiffener 62 includes one or more columns 70 of the base members 46A and 48A. Each base member column 70 includes a respective interconnected set of the base masses 46A and the base arms 48A. Each base member column 70 of FIG. 10, for example, is formed from a respective set of base members 46A and 48A (e.g., 48A, 46A, 48A, 46A, 48A, 46A, 48A, 46A, 48A) sequentially arranged along the vertical axis between the first skin 22 and the second skin 24. The base masses 46A in laterally adjacent base member columns 70 (along the first lateral axis) may be linked by the respective base arms 48A. Referring to FIG. 9, the base masses 46A in each base member column 70 along the second lateral axis may also be linked by the respective base arms 48A.

Referring to FIG. 10, each first core wall 64 includes a respective interconnected set of the base masses 46A and the base arms 48A. The first core wall 64 of FIG. 10, for example, is formed from a respective set of base members 46A and 48A (e.g., 48A, 46A, 48A, 46A and 48A) sequentially arranged along the first lateral axis between a respective neighboring pair of the core stiffeners 62. The base masses 46A in this first core wall 64 are also linked to the first skin 22 by the respective base arms 48A. Referring to FIG. 8, the base masses 46A in each first core wall 64 along the second lateral axis may also be linked by the respective base arms 48A.

Referring to FIG. 10, each second core wall 66 includes a respective interconnected set of the base masses 46A and the base arms 48A. The second core wall 66 of FIG. 10, for example, is formed from a respective set of base members 46A and 48A (e.g., 48A, 46A, 48A, 46A and 48A) sequentially arranged along the first lateral axis between a respective neighboring pair of the core stiffeners 62. The base masses 46A in this second core wall 66 are also linked to the second skin 24 by the respective base arms 48A. Referring to FIG. 8, the base masses 46A in each second core wall 66 along the second lateral axis may also be linked by the respective base arms 48A.

Referring to FIG. 10, each core damper 60 projects laterally partially into a respective one of the internal cavities 68. The core damper 60 of FIG. 10, for example, projects in the first lateral (x) direction out from a respective one of the core stiffeners 62 to a (e.g., unsupported) distal end 72 of that core damper 60. The damper distal end 72 is laterally spaced and disengaged from the other core stiffener 62 forming the respective internal cavity 68. The core damper 60 is vertically spaced and disengaged from the opposing walls 64 and 66 forming the respective internal cavity 68. The core damper 60 of FIG. 10 is thereby cantilevered from the core base 58 and its respective core stiffener 62.

Figure 11A:
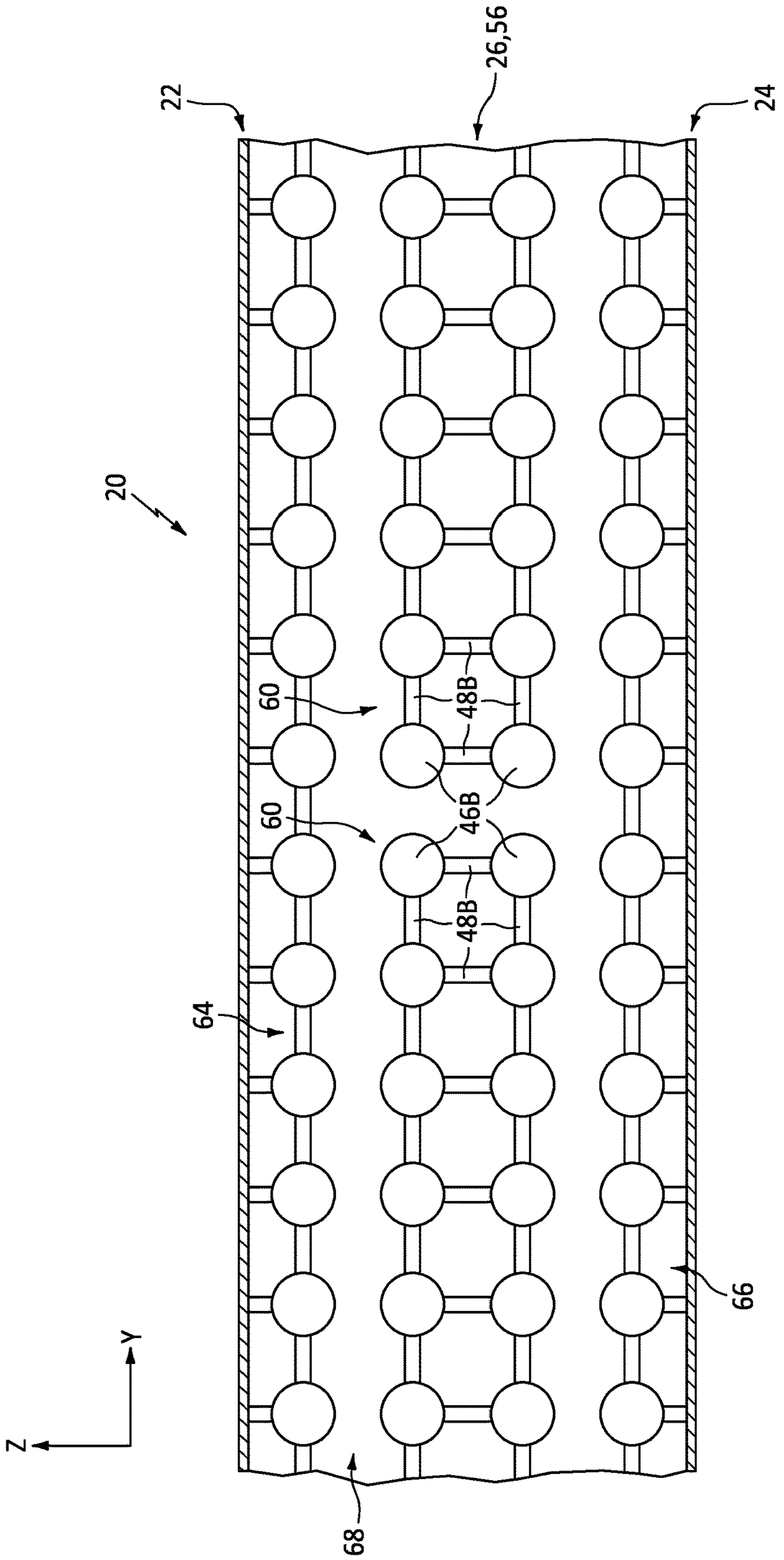
FIGS. 11A and 11B are sectional illustrations of another portion of the damped structure taken along line 8-8 in FIG. 7 with various core damper arrangements.
Figure 11B:
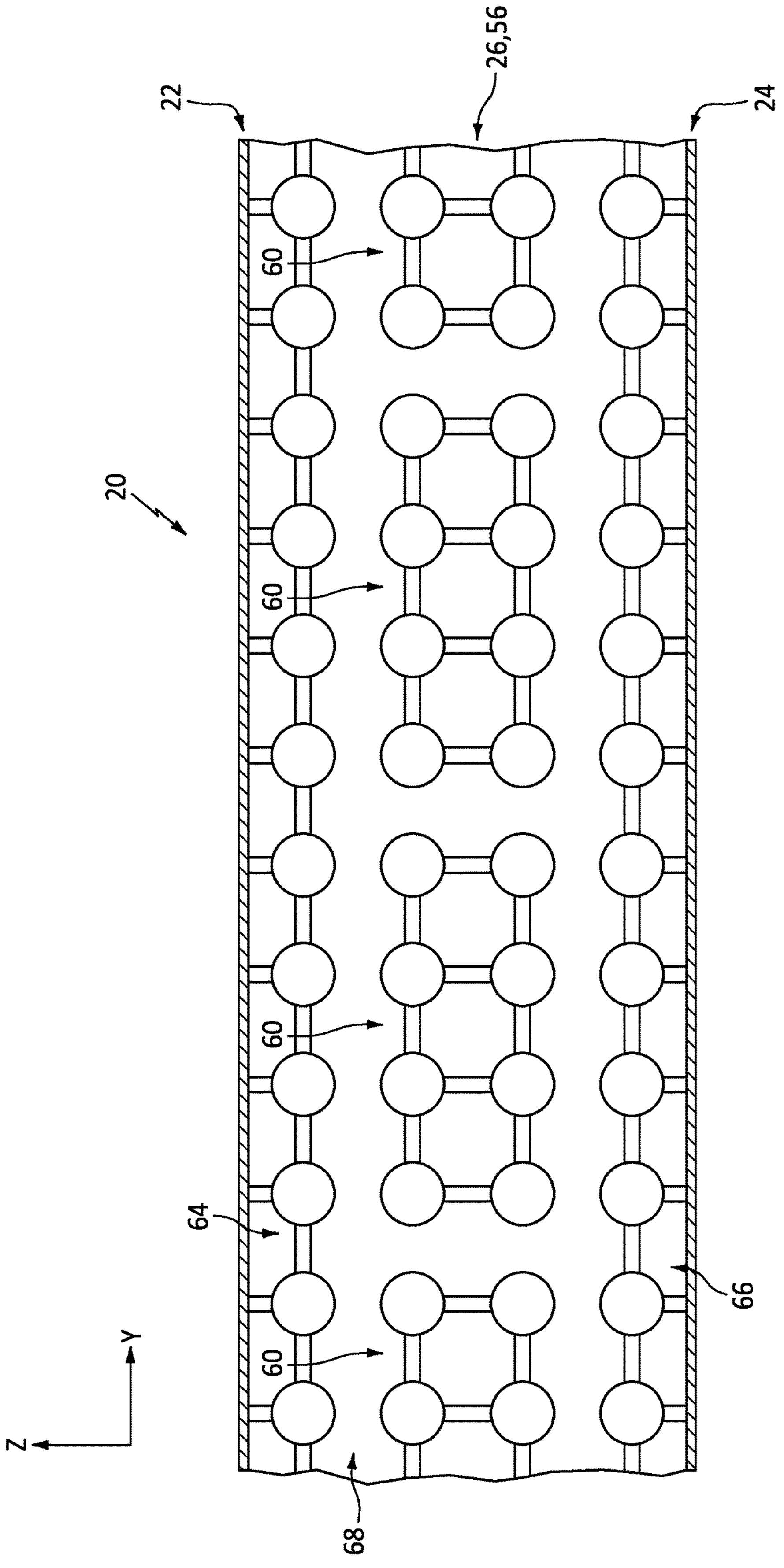
Figure 12B:
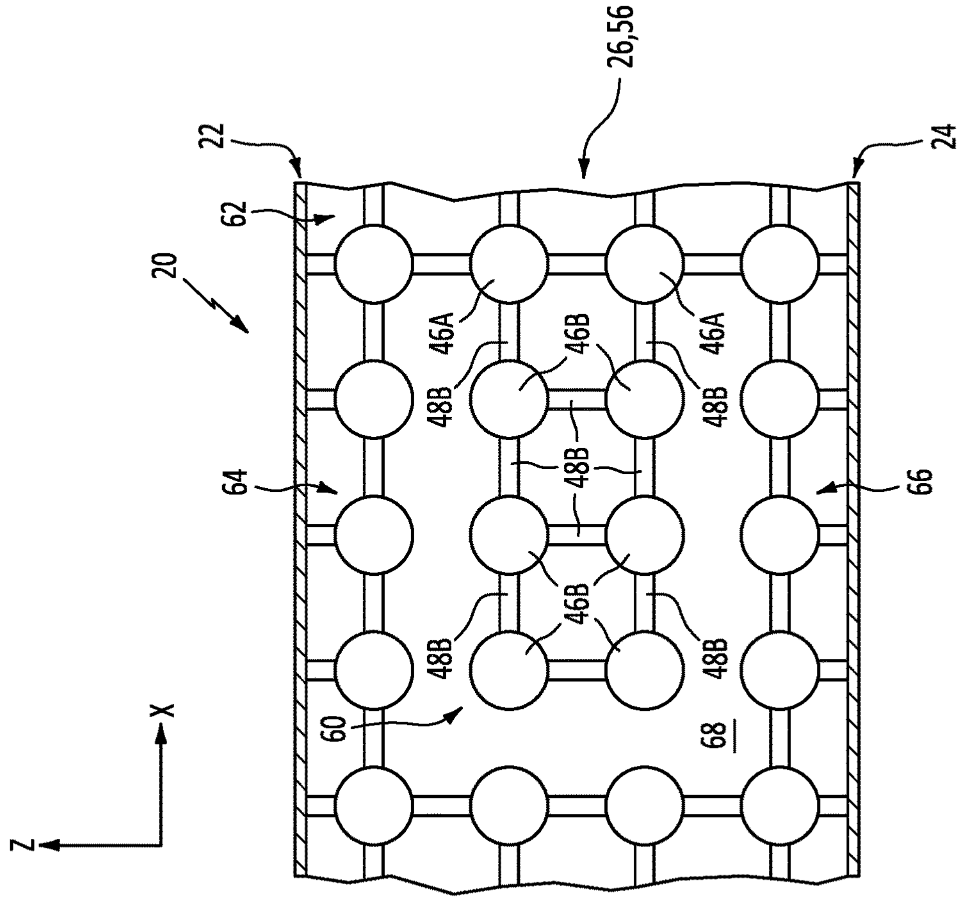
FIGS. 12A-C are partial sectional illustrations of the damped structure with various core damper arrangements.
Figure 12A:
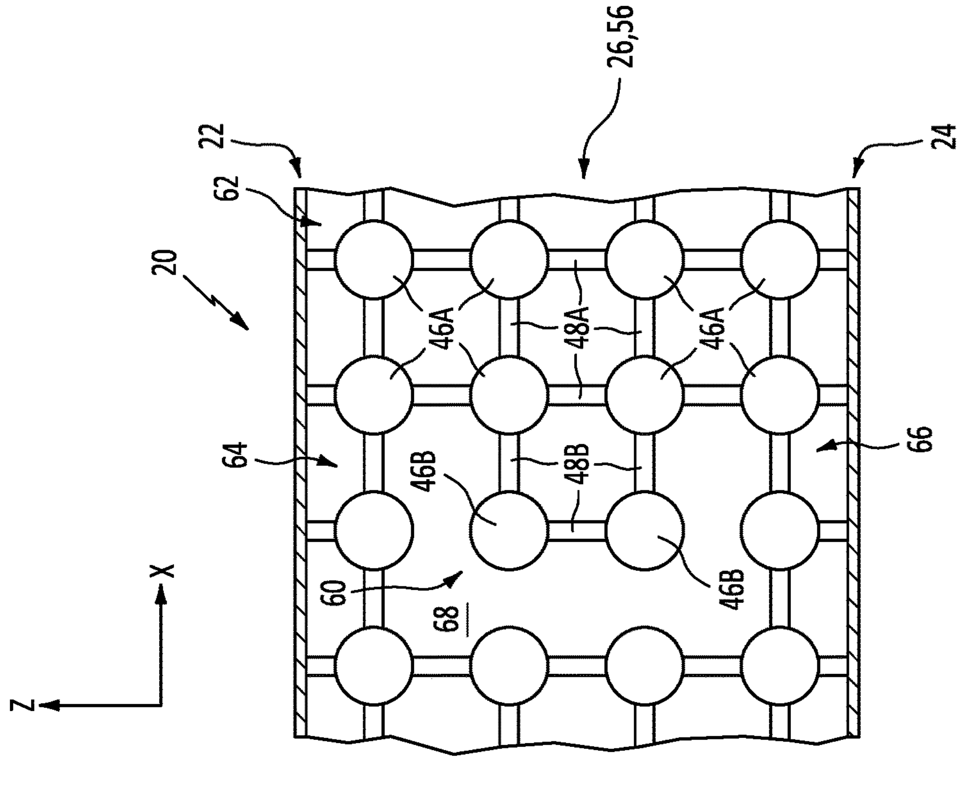
Figure 12C:
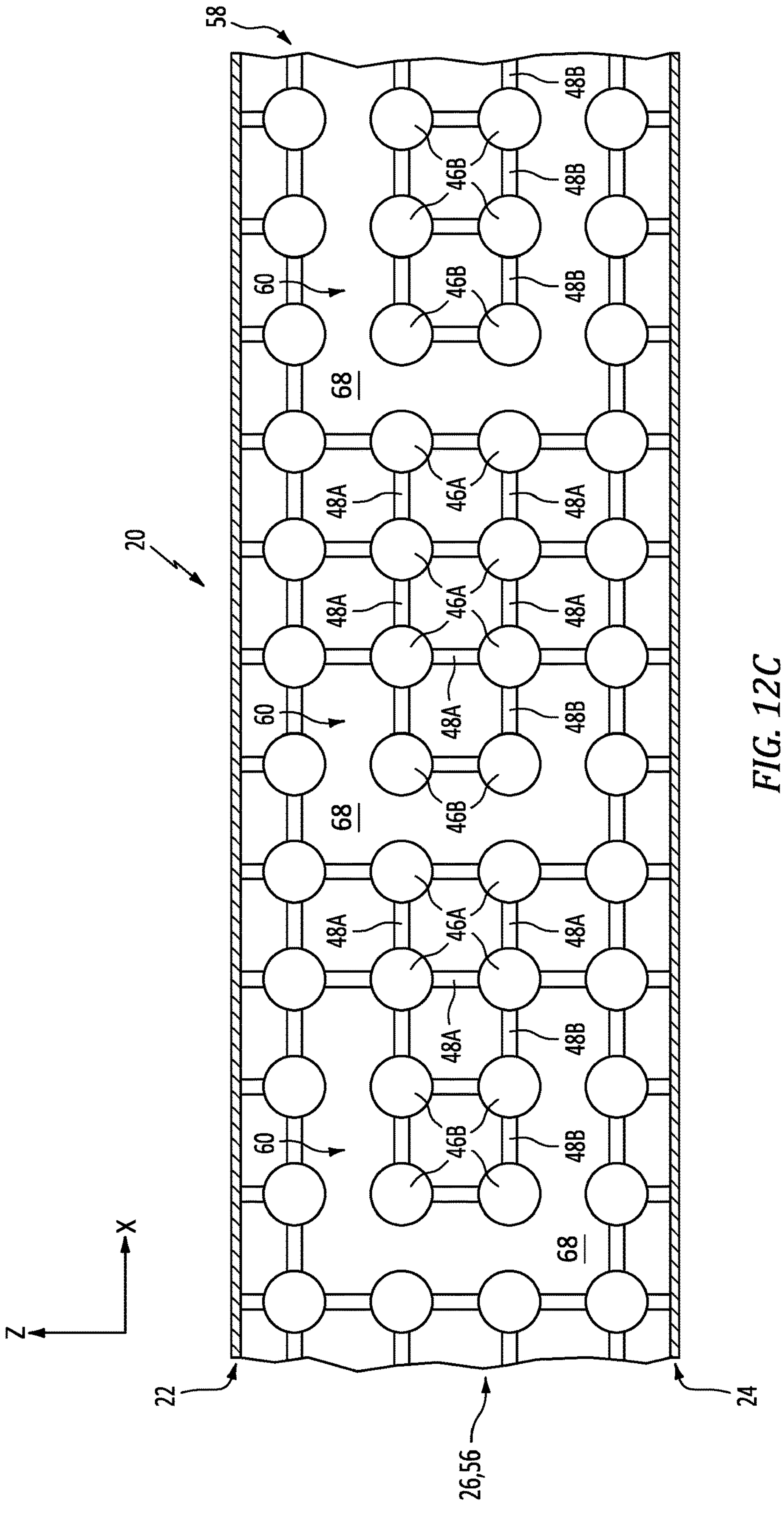

The core damper 60 includes one or more rows 74 of the damper members 46B and 48B. Each damper member row 74 includes a respective interconnected set of the damper masses 46B and the damper arms 48B. Each damper member row 74 of FIG. 10, for example, is formed from a respective set of damper members 46B and 48B (e.g., 48B, 46B, 48B and 46B) sequentially arranged along the first lateral axis between the respective core stiffener 62 and the damper distal end 72 of the respective core damper 60. Here, a respective one of the damper masses 46B is disposed at the damper distal end 72 of the respective core damper 60. The damper masses 46B in vertically adjacent damper member rows 74 may be linked by the respective damper arms 48B. Referring to FIG. 8, the damper masses 46B in each damper member row 74 along the second lateral axis may also be linked by the respective damper arms 48B. However, in other embodiments, some or all of these damper arms 48B along with the second lateral axis may be omitted to provided multiple lateral (e.g., in the second lateral (y) direction) side-by-side core dampers 60 within a common internal cavity 68; e.g., see FIGS. 11A and 11B. Moreover, while each damper member row 74 of FIG. 10 is shown with two of the damper masses 46B and two of the damper arms 48B, one or more or all of the damper member rows 74 may each alternatively include (A) a single damper mass 46B and/or a single damper arm 48B (e.g., see FIG. 12A), or (B) more than two damper masses 46B and/or more than two damper arms 48B (e.g., see FIG. 12B). It is also contemplated that at least one core damper 60 may have a different configuration than another one of the core dampers 60; e.g., see FIG. 12C. With such an arrangement, the core dampers 60 may be tuned to damp various different vibratory frequencies. The present disclosure, of course, is not limited to the foregoing exemplary core damper configurations.

Referring to FIG. 10, the damped structure 20 may be subject to vibrations during apparatus operation; e.g., vehicle operation, powerplant operation, etc. These vibrations may excite movement of one or more the core damper(s) 60. Core damper movement may include flexing (e.g., bending) vertically up and down. This vertical flexing may at least partially absorb and dissipate vibrational energy. The damped structure 20 may thereby reduce vibration transmission therewith and/or reduce vibration transmission therethrough.

In some embodiments, the core members 46 and 48 may be formed together as a single monolithic body using, for example, additive manufacturing, casting or otherwise. Such manufacturing techniques may also be used to form the first skin 22 and/or the second skin 24 integral with the cellular core 26 in the monolithic body. Of course, in other embodiments, the first skin 22 and/or the second skin 24 may alternatively be formed discrete from the cellular core 26 and subsequently bonded and/or otherwise attached to the cellular core 26. The present disclosure, however, is not limited to any particular cellular core manufacturing techniques.

Figure 13:
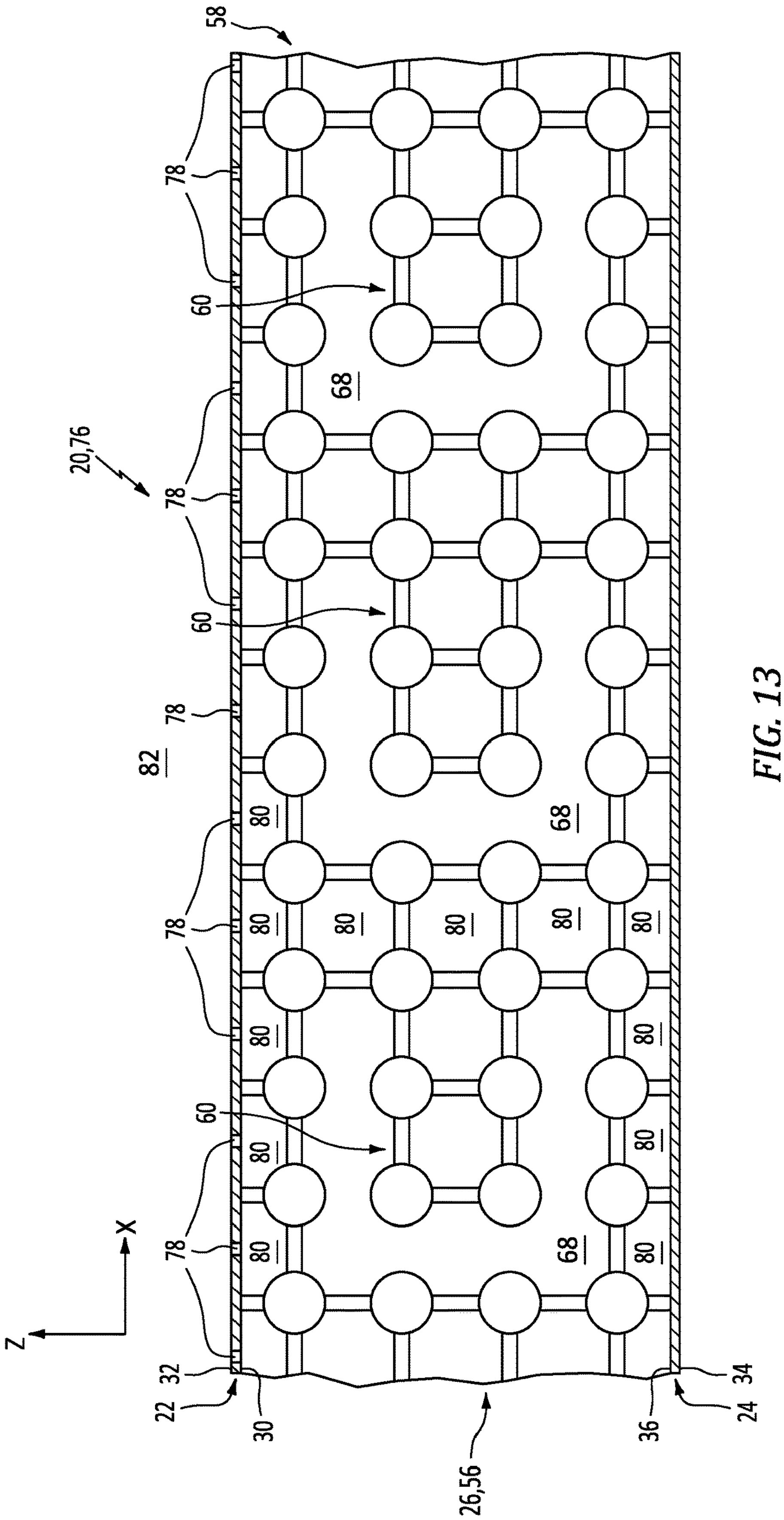
FIGS. 13-16 are sectional illustrations of the damped structure configured as an acoustic structure with various resonance chamber configurations.

In some embodiments, referring to FIG. 13, the damped structure 20 may also be configured as an acoustic structure 76; e.g., an acoustic panel. The first skin 22 of FIG. 13, for example, is configured as a perforated skin. More particularly, the first skin 22 includes one or more first skin perforations 78. Each of these first skin perforations 78 extends vertically through the first skin 22 between the opposing side surfaces 30 and 32 of the first skin 22. The first skin perforations 78 are fluidly coupled with one or more interstices 80 (e.g., gaps, spaces, etc.) formed between the core members 46 and 48. At least some of these interstices 80 may fluidly couple the first skin perforations 78 with one or more of the internal cavities 68. With this arrangement, the interstices 80 and the internal cavities 68 may form one or more resonance chambers within the cellular core 26 between the first skin 22 and the second skin 24.

During operation, sound waves propagating in a volume 82 (e.g., a cavity, a passage, etc.) adjacent the first skin 22 may enter the damped structure 20 and its one or more resonance chambers through the first skin perforations 78. These sound waves may be reflected by one or more of the core members 46 and 48 and/or the second skin 24, and travel back out of the damped structure 20 through the first skin perforations 78. These reflected sound waves exiting the damped structure 20 may destructively interfere with other (e.g., incoming) sound waves propagating within the volume thereby attenuating those other sound waves.

Figure 14:
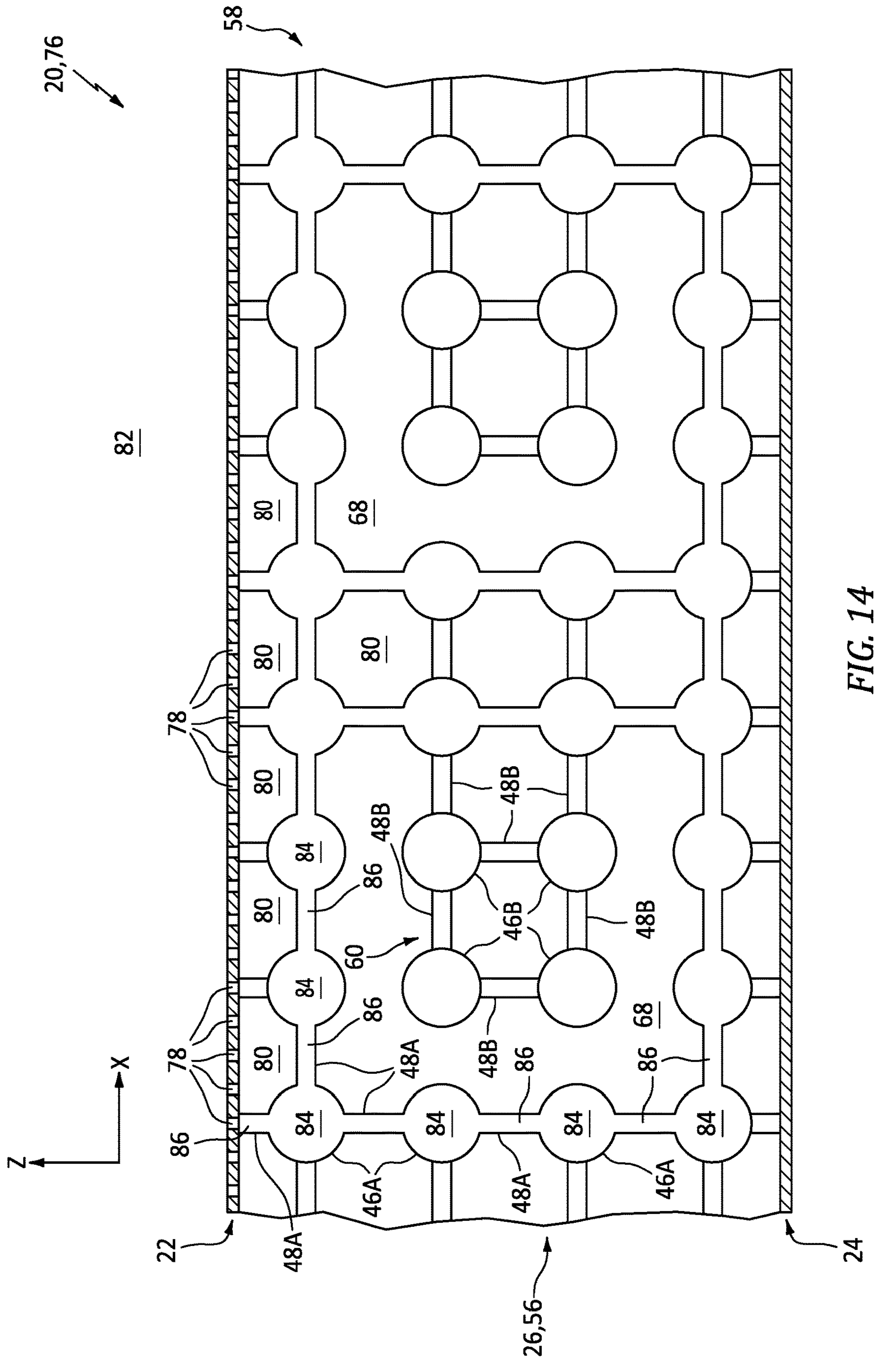

In some embodiments, referring to FIG. 14, one, some or all of the core members 46 and 48 may be hollow to form one or more (e.g., additional) resonance chambers. These one or more resonance chambers are fluidly coupled with one or more of the respective first skin perforations 78. Each resonance chamber may include an internal volume 84 within one or more of the base masses 46A and/or an internal bore 86 within one or more of the base arm 48A. While the resonance chamber(s) of FIG. 14 are formed (e.g., only) by the core base 58, it is contemplated one or more of the resonance chamber(s) may also extend into one or more of the damper members 46B and 48B. Furthermore, while the damped structure 20 of FIG. 14 is shown with resonance chamber(s) inside and outside of the core members 46 and 48, it is contemplated the first skin perforations 78 may alternatively be only fluidly coupled with the resonance chamber(s) inside of the core members 46 and 48; e.g., not with the interstices 80 and/or the internal cavities 68.

Figure 15:
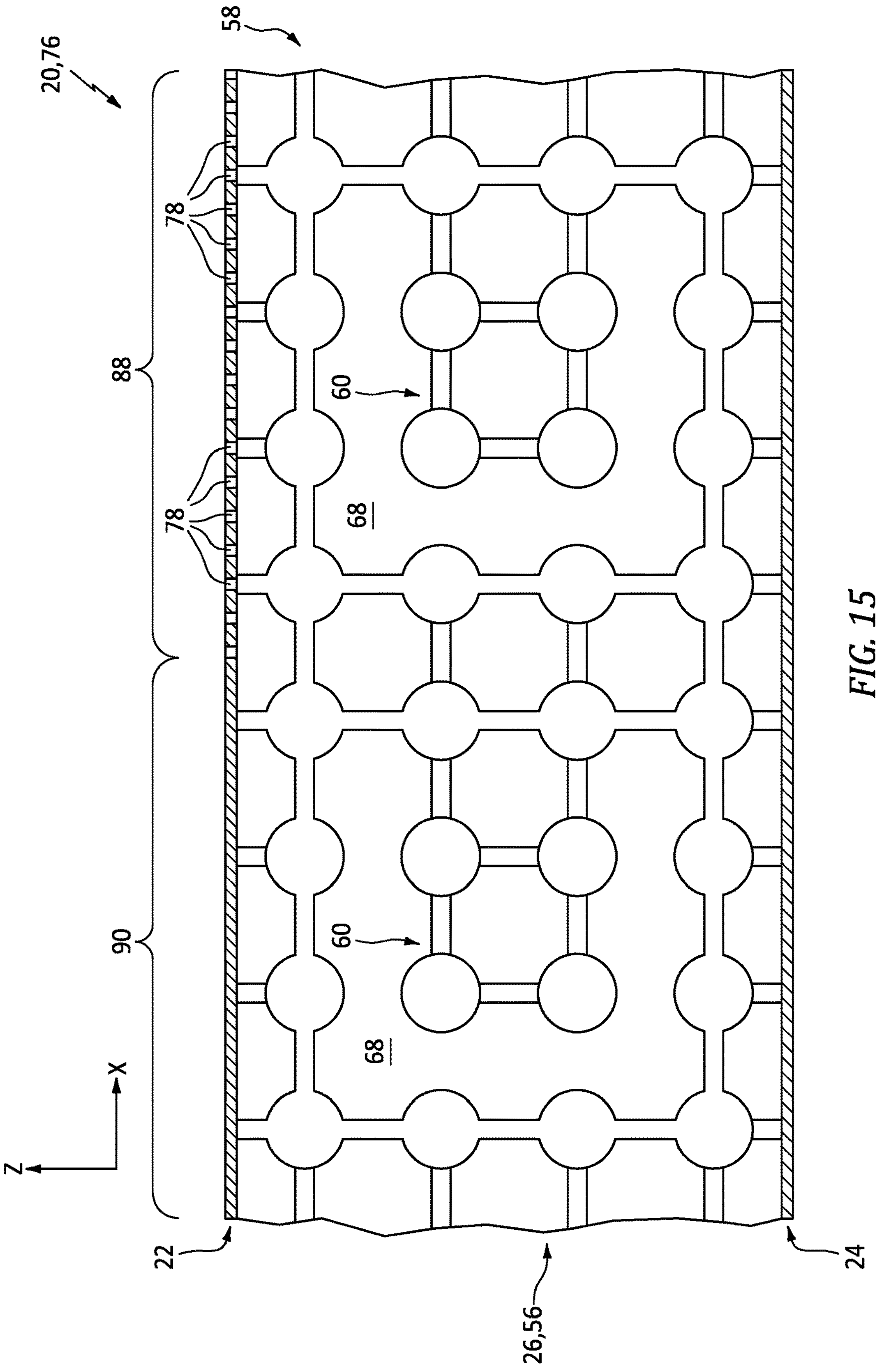

In some embodiments, an entirety of the first skin 22 may be perforated. In other embodiments, referring to FIG. 15, a select portion 88 (or portions) of the first skin 22 may be perforated. With such an arrangement, the perforated portion (s) 88 of the first skin 22 may facilitate sound attenuation, while remaining portion(s) 90 of the damped structure 20 may be configured for vibration damping without sound attenuation. Or, one or more portions 90 of the first skin 22 may be non-perforated to laterally extend the resonance chamber(s) within the cellular core 26.

Figure 16:
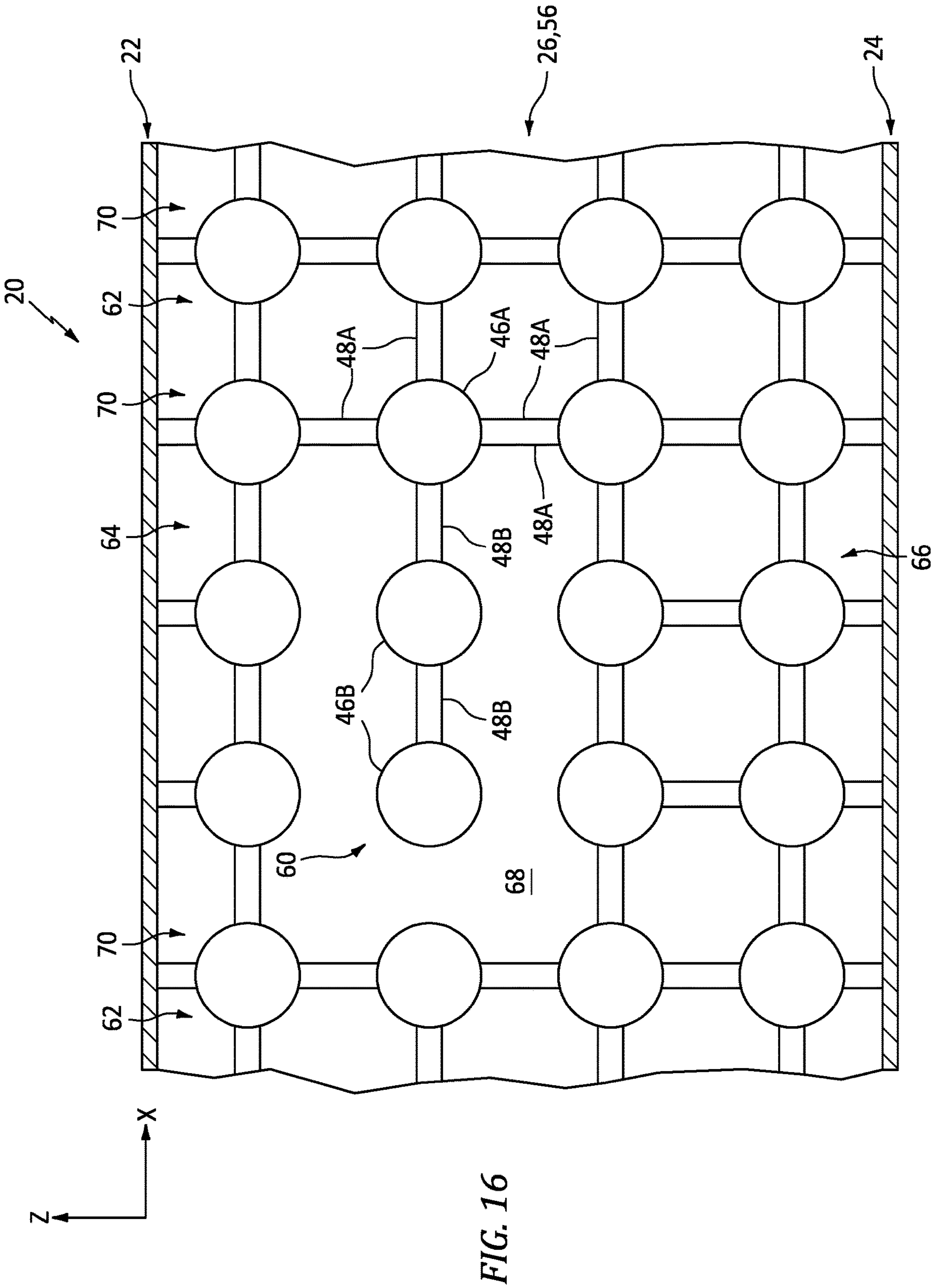

In some embodiments, referring to FIG. 10, each core damper 60 may include a plurality of (e.g., equispaced) rows of the core masses 46 along the vertical axis; e.g., the z-axis. In other embodiments, for example referring to FIG. 16, any one or more or all of the core dampers 60 described above may each alternatively include a single row of the core masses 46 along the vertical axis; e.g., the z-axis. However, this core dampers 60 may include one or more (e.g., equispaced) rows of the core masses 46 along the first lateral axis; e.g., the x-axis. The core dampers 60 may also include one or more (e.g., equispaced) rows of the core masses 46 along the second lateral axis; e.g., the y-axis.

In some embodiments, one or more or all of the internal cavities 68 and/or the interstices 80 may be filled with a gas (e.g., air) or may otherwise be empty. In other embodiments, one or more or all of the internal cavities 68 and/or the interstices 80 may be partially or completely filled with a filler material. Examples of the filler material include, but are not limited to, foam, bulk material, a liquid, a gel and/or various other homogeneous or non-homogenous materials.

Figures 17A, 17B, 17C, 17D:
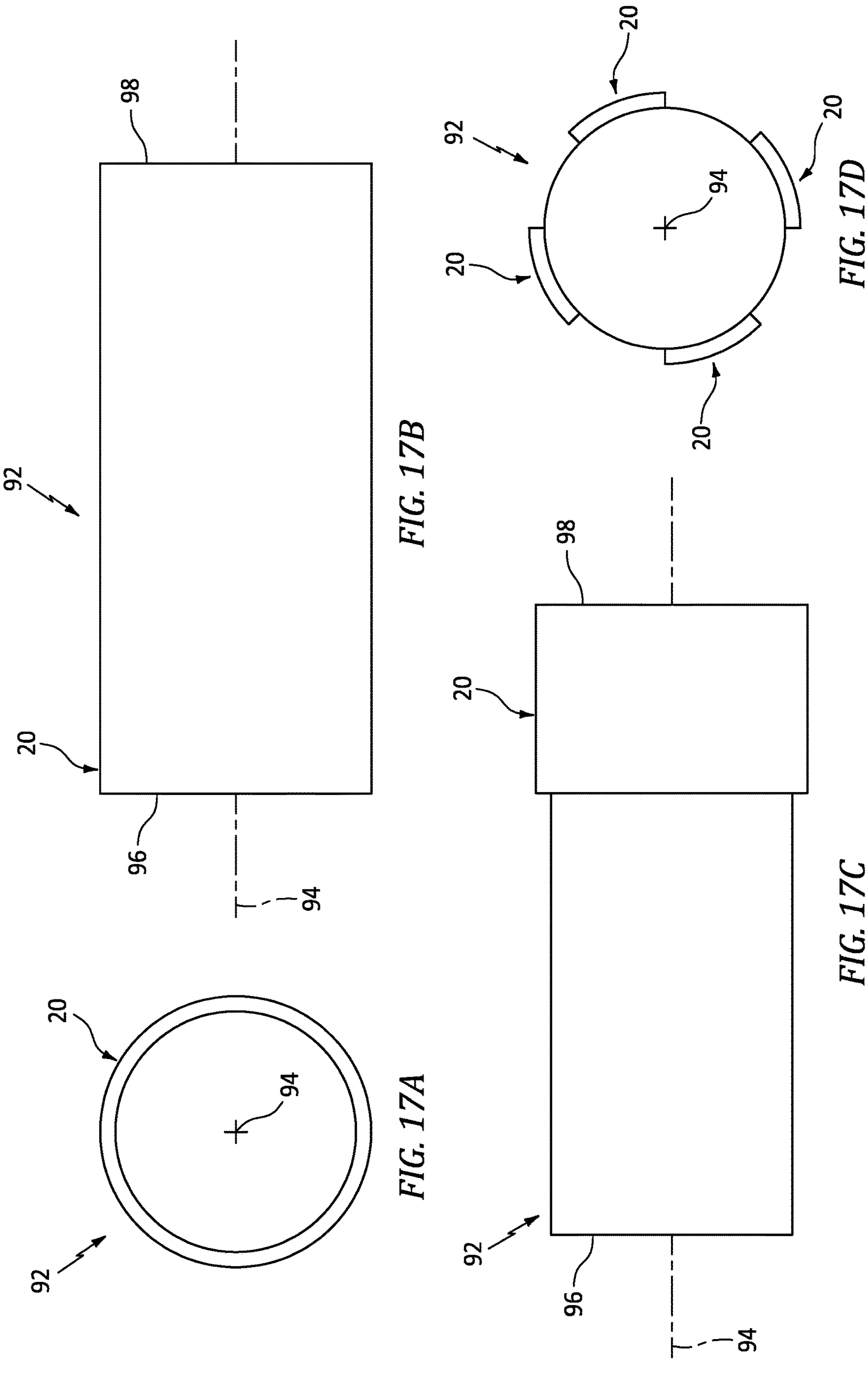
FIGS. 17A-D are illustrations of a component including one or more damped structures with various arrangements.

Referring to FIGS. 17A and 17B, the damped structure 20 may form an entirety of an apparatus component 92. For example, where the apparatus component 92 is a tubular duct wall (e.g., a combustor wall or another flowpath wall), the damped structure 20 may extend axially along an axial centerline 94 of the apparatus component 92 between and to opposing axial ends 96 and 98 of the apparatus component 92. The damped structure 20 may also extend completely circumferentially around the axial centerline 94. However, referring to FIGS. 17C and 17D, the damped structure 20 may alternatively form a respective section of the apparatus component 92. The damped structure 20 of FIG. 17C, for example, extends axially partially along the axial centerline 94 between the component ends 96 and 98; although, the damped structure 20 may (or may not) extend completely circumferentially around the axial centerline 94. In another example, referring to FIG. 17D, the apparatus component 92 includes one or more of the damped structures 20. These damped structures 20 may be arranged in an array about the axial centerline 94. Each of the damped structures 20 extends partially circumferentially about the axial centerline 94, and is circumferentially spaced from each circumferentially adjacent damped structure 20. Each damped structure 20, however, may (or may not) extend completely axially along the axial centerline 94 between and to the apparatus ends 96 and/or 98. With such an arrangement, the damped structures 20 may be located to certain locations subject to, for example, peak vibrations and/or peak sound waves.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus, comprising:

a structure including a first skin, a second skin and a cellular core connected to the first skin and the second skin;

the cellular core including a cantilevered damper and an internal cavity between the first skin and the second skin; and the cantilevered damper projecting into the internal cavity, and the cantilevered damper including a plurality of damper masses and a plurality of damper arms interconnecting the plurality of damper masses together, the plurality of damper masses including a first damper mass and a second damper mass, the plurality of damper arms including a first damper arm and a second damper arm, the first damper mass connecting the first damper arm to the second damper arm, and the second damper arm connecting the first damper mass to the second damper mass;

wherein the first damper arm, the first damper mass, the second damper arm and the second damper mass are arranged sequentially along a first axis.

2. The apparatus of claim 1, wherein the cantilevered damper projects into the internal cavity along the first axis to an unsupported distal end of the cantilevered damper.

3. The apparatus of claim 1, wherein the plurality of damper masses further include a third damper mass;

the plurality of damper arms further include a third damper arm; and the third damper arm is between the second damper mass and the third damper mass along the first axis.

4. The apparatus of claim 1, wherein the cellular core is between the first skin and the second skin along a second axis that is angularly offset from the first axis;

the plurality of damper masses further include a third damper mass;

the plurality of damper arms further include a third damper arm; and the third damper arm is between the second damper mass and the third damper mass along the second axis.

5. The apparatus of claim 1, wherein the cellular core is between the first skin and the second skin along a second axis that is angularly offset from the first axis;

the plurality of damper masses further include a third damper mass;

the plurality of damper arms further include a third damper arm; and the third damper arm is between the second damper mass and the third damper mass along a third axis that is angularly offset from the first axis and the second axis.

6. An apparatus, comprising:

a structure including a first skin, a second skin and a cellular core connected to the first skin and the second skin;

the cellular core including a cantilevered damper and an internal cavity between the first skin and the second skin; and the cantilevered damper projecting into the internal cavity, and the cantilevered damper including a plurality of damper masses and a plurality of damper arms interconnecting the plurality of damper masses together, the plurality of damper masses including a first damper mass and a second damper mass, the plurality of damper arms including a first damper arm and a second damper arm, the first damper mass connecting the first damper arm to the second damper arm, and the second damper arm connecting the first damper mass to the second damper mass;

wherein the first damper mass is between the first damper arm and the second damper arm along a first axis; and wherein the second damper arm is between the first damper mass and the second damper mass along a second axis that is angularly offset from the first axis.

7. The apparatus of claim 6, wherein the cellular core is between the first skin and the second skin along the second axis.

8. The apparatus of claim 6, wherein the cellular core is between the first skin and the second skin along a third axis is angularly offset from the first axis and the second axis.

9. The apparatus of claim 1, wherein the first damper mass has an internal volume that is fluidly coupled with a perforation in the first skin.

10. The apparatus of claim 9, wherein the first damper arm has an internal bore that is between and fluidly couples the internal volume to the perforation in the first skin.

11. The apparatus of claim 1, wherein the internal cavity is fluidly coupled with one or more perforations in the first skin.

12. The apparatus of claim 1, wherein the cellular core further includes a lattice structure that at least partially forms the internal cavity between the first skin and the second skin; and the cantilevered damper is connected to and projects out from a base of the lattice structure into the internal cavity.

13. The apparatus of claim 12, wherein the lattice structure includes a plurality of base masses and a plurality of base arms interconnecting the plurality of base masses together.

14. The apparatus of claim 13, wherein a first of the plurality of base masses has an internal volume that is fluidly coupled with a perforation through the first skin.

15. The apparatus of claim 6, wherein the first damper mass has an internal volume that is fluidly coupled with a perforation in the first skin.

16. The apparatus of claim 15, wherein the first damper arm has an internal bore that is between and fluidly couples the internal volume to the perforation in the first skin.

17. The apparatus of claim 6, wherein the internal cavity is fluidly coupled with one or more perforations in the first skin.

18. The apparatus of claim 6, wherein the cellular core further includes a lattice structure that at least partially forms the internal cavity between the first skin and the second skin; and the cantilevered damper is connected to and projects out from a base of the lattice structure into the internal cavity.

19. The apparatus of claim 18, wherein the lattice structure includes a plurality of base masses and a plurality of base arms interconnecting the plurality of base masses together.

20. The apparatus of claim 19, wherein a first of the plurality of base masses has an internal volume that is fluidly coupled with a perforation through the first skin.

* * * * *